United States Patent
Liu et al.

(10) Patent No.: US 11,101,957 B2
(45) Date of Patent: Aug. 24, 2021

(54) REFERENCE SIGNAL SENDING METHOD AND APPARATUS

(71) Applicant: Huawei Technologies Co., Ltd., Shenzhen (CN)

(72) Inventors: Yong Liu, Shanghai (CN); Lu Wu, Shenzhen (CN); Xiang Ren, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 16/523,737

(22) Filed: Jul. 26, 2019

(65) Prior Publication Data
US 2019/0349168 A1    Nov. 14, 2019

Related U.S. Application Data

(63) Continuation of application No. PCT/CN2017/119430, filed on Dec. 28, 2017.

(30) Foreign Application Priority Data

Jan. 26, 2017    (CN) .......................... 201710061787.6

(51) Int. Cl.
*H04L 5/00* (2006.01)
*H04W 72/04* (2009.01)

(52) U.S. Cl.
CPC .......... *H04L 5/0051* (2013.01); *H04L 5/0007* (2013.01); *H04L 5/0062* (2013.01); *H04W 72/042* (2013.01)

(58) Field of Classification Search
CPC ... H04L 5/0051; H04L 5/0007; H04L 5/0062; H04W 72/042
See application file for complete search history.

(56) References Cited

U.S. PATENT DOCUMENTS

2013/0176987 A1    7/2013  Kawamura
2013/0343299 A1*  12/2013  Sayana ................... H04B 7/04
(Continued)

FOREIGN PATENT DOCUMENTS

CN    101626620 A    1/2010
CN    103582141 A    2/2014
(Continued)

OTHER PUBLICATIONS

Samsung: "Remaining issues on quasi collocation between CSI-RS, CRS and DMRS", 3GPP Draft; RI-124558, hereinafter "Samsung", section 2.2.*
(Continued)

*Primary Examiner* — Ronald B Abelson
(74) *Attorney, Agent, or Firm* — Leydig, Voit & Mayer, Ltd.

(57) ABSTRACT

This application discloses a reference signal sending method and apparatus, to resolve a problem that only a fixed mapping manner and a single function are available in an existing RS mapping and configuration solution, so as to improve spectral efficiency. The method includes: determining a time-frequency resource used to carry a first reference signal, where the time-frequency resource is a dedicated time-frequency resource of at least one second reference signal; and sending the first reference signal by using the determined time-frequency resource.

15 Claims, 9 Drawing Sheets

(56) References Cited

U.S. PATENT DOCUMENTS

2013/0343340 A1* 12/2013 Seo .................. H04W 72/04
2014/0307576 A1   10/2014 Nagata et al.
2015/0229452 A1    8/2015 Nagata et al.

FOREIGN PATENT DOCUMENTS

CN        103918204 A    7/2014
CN        104620655 A    5/2015

OTHER PUBLICATIONS

"Enhanced DM-RS pattern for NCT," 3GPP TSG RAN WG1 Meeting #72, St. Julian's, Malta, R1-130829, pp. 1-2, 3rd Generation Partnership Project, Valbonne, France (Jan. 28-Feb. 1, 2013).
"Evaluation and Analysis of New DMRS Pattern in NCT," 3GPP TSG-RAN WG1 #72b, Chicago, USA, R1-131529, pp. 1-6, 3rd Generation Partnership Project, Valbonne, France (Apr. 15-19, 2013).

* cited by examiner

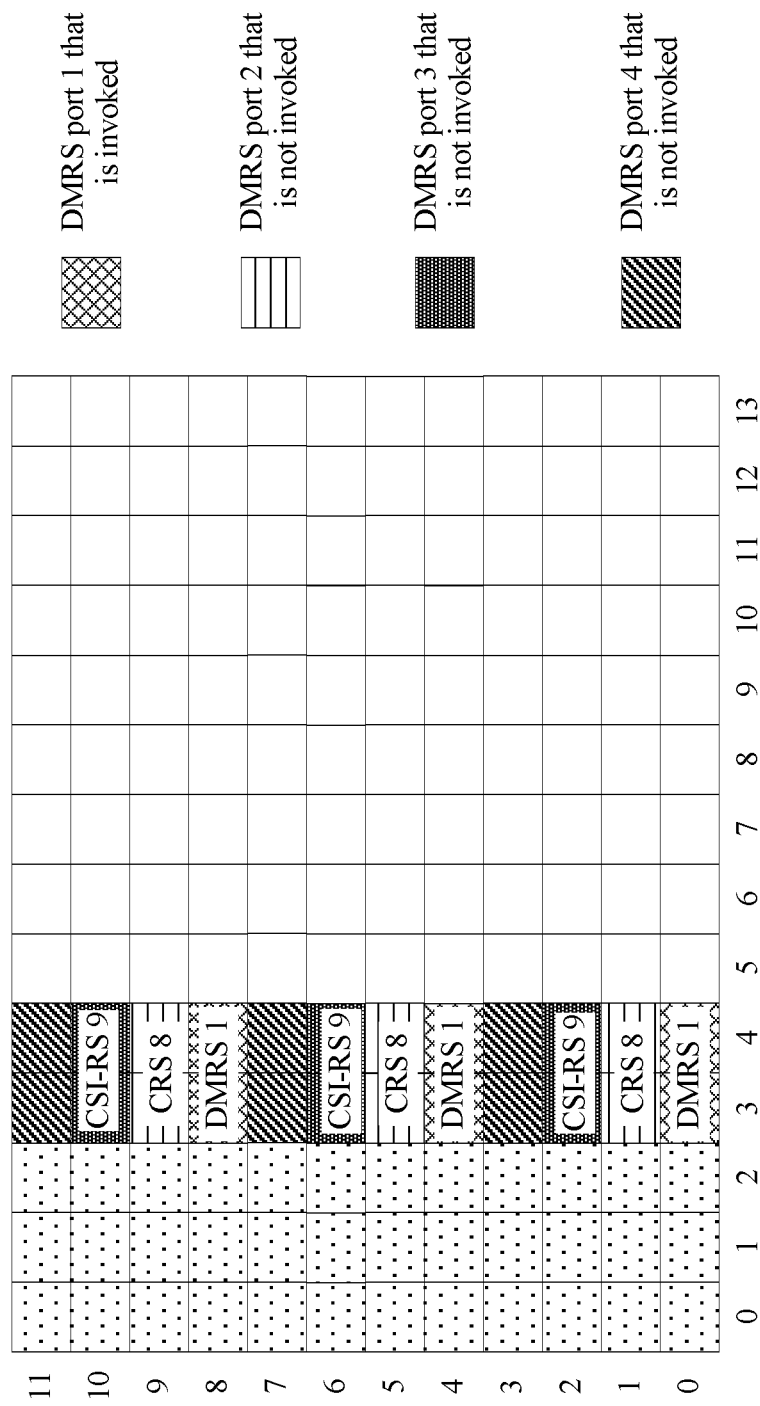

REFERENCE SIGNAL SENDING METHOD AND APPARATUS

CROSS-REFERENCE TO RELATED APPLICATIONS

This application is a continuation of International Application No. PCT/CN2017/119430, filed on Dec. 28, 2017, which claims priority to Chinese Patent Application No. 201710061787.6, filed on Jan. 26, 2017. The disclosures of the aforementioned applications are hereby incorporated by reference in their entireties.

TECHNICAL FIELD

Embodiments of this application relate to the field of communications technologies, and in particular, to a reference signal sending method and apparatus.

BACKGROUND

In a current communications system, radio channel information is obtained and compensated mainly based on a pilot signal or a reference signal (RS). In an orthogonal frequency division multiplexing (OFDM) system, RSs are distributed on different resource elements (RE) in time-frequency two-dimensional space within OFDM symbols, and have known amplitudes and phases. In a multiple-input multiple-output (MIMO) system, each transmit antenna (a virtual antenna or a physical antenna) has an independent data channel. Based on a foreseen RS signal, a receiver performs channel estimation for each transmit antenna and restores sent data based on the channel estimation.

A main purpose of channel estimation is to compensate for channel fading and noise, so as to rebuild a signal receiving process, and an RS foreseen by a transmitter and a receiver is used to track a change of a channel in time domain and frequency domain. For example, to implement channel quality measurement and data demodulation of a high-order multi-antenna system, a plurality of RSs are defined in a long term evolution-advanced (LTE-A) system: a cell-specific reference signal (CRS), a demodulation reference signal (DMRS), and a channel state information-reference signal (CSI-RS). The DMRS is used for demodulation of a physical downlink shared channel (PDSCH). The CSI-RS is used for channel measurement corresponding to a physical antenna port. This reference signal is introduced in R10 to measure channel state information in transmission mode (TM) 9/10, and is further used to generate configuration information related to scheduling, link adaptation, and MIMO transmission. Specifically, the system reports the following information based on a CSI-RS measurement result: a channel quality indicator (CQI), a precoding matrix indicator (PMI), a rank indication (RI), and the like. The CRS is used to measure downlink channel quality, so as to perform resource scheduling and support a link adaptation technology. Therefore, the CRS is sent over all available frequency bands and all subframes.

In a current standard, the RS is usually generated according to a fixed sequence, and is mapped to a physical resource block (PRB) based on a quantity of ports by using fixed density and in a fixed manner. Usually, the RS only has a single function, and a different kind of RS completes only its corresponding function. In each of current pilot patterns, a mapping rule and a function of each RS port are the same, and cannot be configured depending on different scenarios. For example, a pilot pattern of the CSI-RS depends on CSI-RS configuration information. In each configuration, locations of time-frequency resources to which RSs corresponding to different quantities of ports are mapped are provided. In an ordinary subframe, RSs corresponding to 31 configurations may occupy 40 REs in total.

With rapid development of communications technologies, features of a high speed, a large capacity, and wide coverage have become major requirements of a future communications system. Therefore, it is especially important to eliminate the following non-ideal characteristics: severe fading and interference caused by an ever increasing communications range as well as complex and diversified communication environments. Requirements for a plurality of scenarios, a plurality of frequency bands, and a plurality of transmission manners are put forwarded in $5^{th}$ Generation (5G) new radio (5G NR). How to flexibly configure an RS in a system depending on different scenarios or requirements, to ensure high-quality data transmission and high resource efficiency has become a problem that needs to be urgently resolved in a 5G NR system.

SUMMARY

This application provides a reference signal sending method and apparatus, to resolve a problem that only a fixed mapping manner and a single function are available in an existing RS mapping and configuration solution, so as to improve spectral efficiency.

According to a first aspect, this application provides a reference signal sending method, including:

determining a time-frequency resource used to carry a first reference signal, where the time-frequency resource is a dedicated time-frequency resource of at least one second reference signal; and sending the first reference signal by using the determined time-frequency resource.

It can be learned that the first reference signal may be carried and sent by using the dedicated time-frequency resource of the at least one second reference signal, so that RS signals such as a DMRS and a CSI-RS can be flexibly mapped onto a same time domain and frequency domain resource. Furthermore, an RS in a system can be flexibly configured depending on different scenarios and requirements, so as to resolve a problem that only a fixed mapping manner and a single function are available in an existing RS mapping and configuration solution, thereby improving spectral efficiency.

In a possible implementation, before the determining a time-frequency resource used to carry a first reference signal, the method further includes:

generating a resource configuration indication, where the resource configuration indication is used to indicate the time-frequency resource that carries the first reference signal, and the time-frequency resource is the dedicated time-frequency resource of the at least one second reference signal; and sending the resource configuration indication.

In a possible implementation, before the determining a time-frequency resource used to carry a first reference signal, the method further includes:

generating a scheduling indication, where the scheduling indication is used to indicate that the first reference signal is to be scheduled, and the time-frequency resource that carries the first reference signal is the dedicated time-frequency resource of the at least one second reference signal; and sending the scheduling indication.

It can be learned that in any one of the foregoing indication sending manners, a base station can indicate a type and a mapping location of an RS that multiplexes a time domain and frequency domain resource, so as to effectively use an idle RE in an RS pattern to transmit another RS signal simultaneously, and improve spectral efficiency.

In a possible implementation, the determined time-frequency resource is within a scheduling period of the first reference signal, and the second reference signal is not scheduled within the scheduling period.

In a possible implementation, a type of the first reference signal is different from a type of the second reference signal.

In a possible implementation, the first reference signal is a CSI-RS, and the second reference signal is a DMRS.

According to a second aspect, this application provides a reference signal receiving method, including:

determining a time-frequency resource used to carry a first reference signal, where the time-frequency resource is a dedicated time-frequency resource of at least one second reference signal; and obtaining the first reference signal by using the determined time-frequency resource.

In a possible implementation, before the determining a time-frequency resource used to carry a first reference signal, the method further includes:

receiving a resource configuration indication, where the resource configuration indication is used to indicate the time-frequency resource that carries the first reference signal, and the time-frequency resource is the dedicated time-frequency resource of the at least one second reference signal.

In a possible implementation, before the determining a time-frequency resource used to carry a first reference signal, the method further includes:

receiving a scheduling indication, where the scheduling indication is used to indicate that the first reference signal is to be scheduled, and the time-frequency resource that carries the first reference signal is the dedicated time-frequency resource of the at least one second reference signal.

In a possible implementation, the determined time-frequency resource is within a scheduling period of the first reference signal, and the second reference signal is not scheduled within the scheduling period.

In a possible implementation, a type of the first reference signal is different from a type of the second reference signal.

In a possible implementation, the first reference signal is a CSI-RS, and the second reference signal is a DMRS.

According to a third aspect, this application provides a reference signal sending apparatus, where the apparatus is deployed in a base station.

The apparatus includes:

a determining module, configured to determine a time-frequency resource used to carry a first reference signal, where the time-frequency resource is a dedicated time-frequency resource of at least one second reference signal; and a sending module, configured to send the first reference signal by using the determined time-frequency resource.

In a possible implementation, the apparatus further includes: a first generation module, configured to generate a resource configuration indication before the time-frequency resource used to carry the first reference signal is determined, where the resource configuration indication is used to indicate the time-frequency resource that carries the first reference signal, and the time-frequency resource is the dedicated time-frequency resource of the at least one second reference signal; and the sending module is further configured to send the resource configuration indication.

In a possible implementation, the apparatus further includes: a second generation module, configured to generate a scheduling indication before the time-frequency resource used to carry the first reference signal is determined, where the scheduling indication is used to indicate that the first reference signal is to be scheduled, and the time-frequency resource that carries the first reference signal is the dedicated time-frequency resource of the at least one second reference signal; and the sending module is further configured to send the scheduling indication.

In a possible implementation, the determined time-frequency resource is within a scheduling period of the first reference signal, and the second reference signal is not scheduled within the scheduling period.

In a possible implementation, a type of the first reference signal is different from a type of the second reference signal.

In a possible implementation, the first reference signal is a CSI-RS, and the second reference signal is a DMRS.

Mutual reference may be made between the apparatus implementation and beneficial effects in the third aspect or any possible implementation of the third aspect of the present invention and the method implementation and beneficial effects in the first aspect or any possible implementation of the first aspect of the present invention. Repeated content is not described herein again.

According to a fourth aspect, this application provides a reference signal receiving apparatus, where the apparatus is deployed in a terminal.

The apparatus includes:

a determining module, configured to determine a time-frequency resource used to carry a first reference signal, where the time-frequency resource is a dedicated time-frequency resource of at least one second reference signal; and an obtaining module, configured to obtain the first reference signal by using the determined time-frequency resource.

In a possible implementation, the apparatus further includes: a first receiving module, configured to receive a resource configuration indication, where the resource configuration indication is used to indicate the time-frequency resource that carries the first reference signal, and the time-frequency resource is the dedicated time-frequency resource of the at least one second reference signal.

In a possible implementation, the apparatus further includes: a second receiving module, configured to receive a scheduling indication, where the scheduling indication is used to indicate that the first reference signal is to be scheduled, and the time-frequency resource that carries the first reference signal is the dedicated time-frequency resource of the at least one second reference signal.

In a possible implementation, the determined time-frequency resource is within a scheduling period of the first reference signal, and the second reference signal is not scheduled within the scheduling period.

In a possible implementation, a type of the first reference signal is different from a type of the second reference signal.

In a possible implementation, the first reference signal is a CSI-RS, and the second reference signal is a DMRS.

Mutual reference may be made between the apparatus implementation and beneficial effects in the fourth aspect or any possible implementation of the fourth aspect of the present invention and the method implementation and beneficial effects in the second aspect or any possible implementation of the second aspect of the present invention. Repeated content is not described herein again.

According to a fifth aspect, this application provides a base station, where the base station includes a processor and a transceiver.

The processor is configured to determine a time-frequency resource used to carry a first reference signal, where the time-frequency resource is a dedicated time-frequency resource of at least one second reference signal; and the transceiver is configured to send the first reference signal by using the time-frequency resource.

In a possible implementation, the processor is further configured to:

generate a resource configuration indication before determining the time-frequency resource used to carry the first reference signal, where the resource configuration indication is used to indicate the time-frequency resource that carries the first reference signal, and the time-frequency resource is the dedicated time-frequency resource of the at least one second reference signal; and the transceiver is further configured to send the resource configuration indication.

In a possible implementation, the processor is further configured to:

generate a scheduling indication before determining the time-frequency resource used to carry the first reference signal, where the scheduling indication is used to indicate that the first reference signal is to be scheduled, and the time-frequency resource that carries the first reference signal is the dedicated time-frequency resource of the at least one second reference signal; and the transceiver is further configured to send the scheduling indication.

In a possible implementation, the determined time-frequency resource is within a scheduling period of the first reference signal, and the second reference signal is not scheduled within the scheduling period.

In a possible implementation, a type of the first reference signal is different from a type of the second reference signal.

In a possible implementation, the first reference signal is a CSI-RS, and the second reference signal is a DMRS.

Mutual reference may be made between the base station implementation and beneficial effects in the fifth aspect or any possible implementation of the fifth aspect of the present invention and the method implementation and beneficial effects in the first aspect or any possible implementation of the first aspect of the present invention. Repeated content is not described herein again.

According to a sixth aspect, this application provides a terminal, where the terminal includes a processor and a transceiver.

The processor is configured to determine a time-frequency resource used to carry a first reference signal, where the time-frequency resource is a dedicated time-frequency resource of at least one second reference signal; and obtain the first reference signal by using the transceiver using the determined time-frequency resource.

In a possible implementation, the processor is further configured to:

receive a resource configuration indication by using the transceiver, where the resource configuration indication is used to indicate the time-frequency resource that carries the first reference signal, and the time-frequency resource is the dedicated time-frequency resource of the at least one second reference signal.

In a possible implementation, the processor is further configured to:

receive a scheduling indication by using the transceiver, where the scheduling indication is used to indicate that the first reference signal is to be scheduled, and the time-frequency resource that carries the first reference signal is the dedicated time-frequency resource of the at least one second reference signal.

In a possible implementation, the determined time-frequency resource is within a scheduling period of the first reference signal, and the second reference signal is not scheduled within the scheduling period.

In a possible implementation, a type of the first reference signal is different from a type of the second reference signal.

In a possible implementation, the first reference signal is a CSI-RS, and the second reference signal is a DMRS.

Mutual reference may be made between the terminal implementation and beneficial effects in the sixth aspect or any possible implementation of the sixth aspect of the present invention and the method implementation and beneficial effects in the second aspect or any possible implementation of the second aspect of the present invention. Repeated content is not described herein again.

According to a seventh aspect, this application provides a reference signal transmission system, including a base station and a terminal, where the terminal is configured to perform the method in the first aspect or any implementation of the first aspect of the present invention; and a network device is configured to perform the method in the second aspect or any implementation of the second aspect of the present invention.

According to an eighth aspect, this application further provides a readable storage medium, configured to store a software instruction used to perform a function in the first aspect or any implementation of the first aspect of the present invention. The software instruction includes a program designed to perform the method in the first aspect or any implementation of the first aspect of the present invention.

According to a ninth aspect, this application further provides a readable storage medium, configured to store a software instruction used to perform a function in the second aspect or any implementation of the second aspect of the present invention. The software instruction includes a program designed to perform the method in the second aspect or any implementation of the second aspect of the present invention.

BRIEF DESCRIPTION OF DRAWINGS

FIG. 5(c) is a schematic diagram of an RS mapping location in still another scenario according to some embodiments of the present invention;

DESCRIPTION OF EMBODIMENTS

The following describes the embodiments of the present invention with reference to accompanying drawings.

To more clearly describe technical solutions provided in the embodiments of the present invention, this application first briefly describes an RS mapping manner on a time-frequency resource in a subframe in a current long term evolution (Long Term Evolution, LTE) standard.

In the current LTE standard, an RS is usually mapped based on a fixed pilot pattern (which may alternatively be referred to as an RS pattern) and a requirement for a quantity of antenna ports. For a given quantity of ports, each RS port is mapped into an RB according to a fixed rule, and each RS has a same function.

Figure 1:
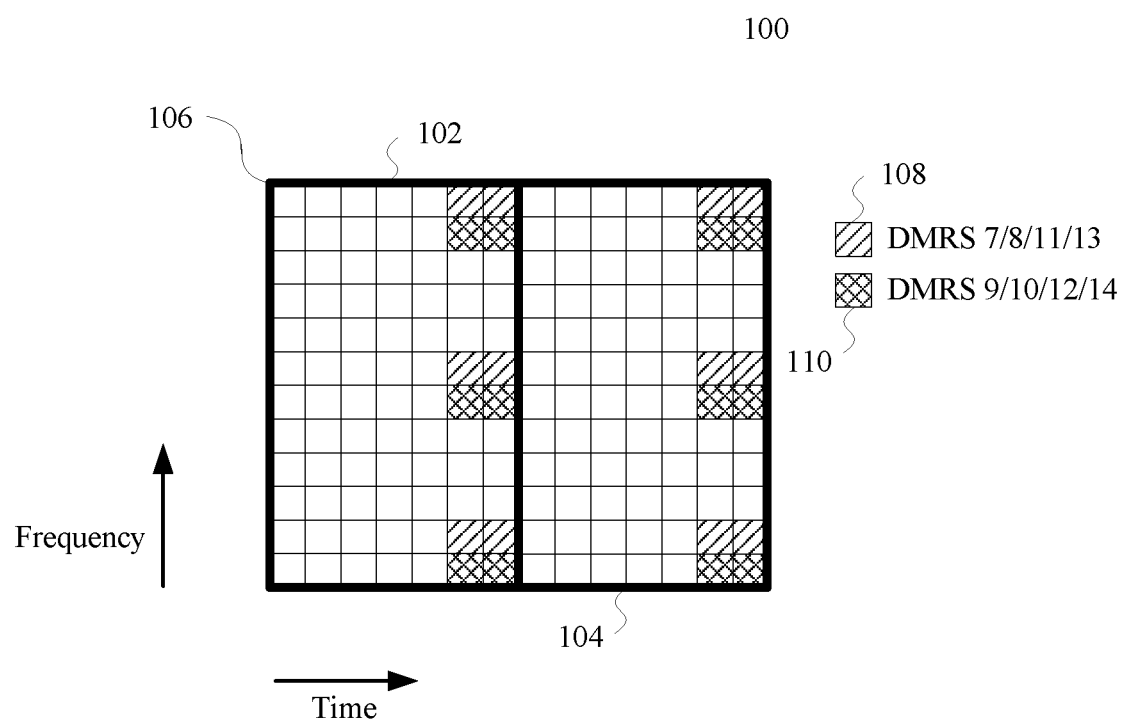
FIG. 1 is a schematic diagram of a DMRS resource distribution manner in a current LTE standard.

For example, FIG. 1 is a schematic diagram of a DMRS resource distribution manner 100 in a current LTE standard. The resource distribution manner shown in FIG. 1 supports single-user MIMO (SU-MIMO) transmission of a maximum of eight symbol streams (also referred to as spatial streams or data streams), and the symbol streams respectively correspond to DMRS ports 7-14. The SU-MIMO currently supports orthogonal DMRS multiplexing for a maximum of eight data streams, and a DMRS pilot frequency occupies 24 resource elements (REs). Multi-user MIMO (MU-MIMO) supports orthogonal DMRS multiplexing for a maximum of four data streams, and a DMRS pilot frequency occupies 12 REs.

In the resource distribution manner shown in FIG. 1, a DMRS resource mapping manner and location are fixed. Within an RB pair (RB pair) 106 including a resource block (RB) 102 and an RB 104, a DMRS occupies 24 REs in total. These REs are distributed on six subcarriers (subcarriers 0, 1, 5, 6, 10, and 11 of each RB) in frequency domain and on four symbols (symbols 5, 6, 12, and 13 of each subframe) in time domain. Four REs distributed on a same subcarrier and occupied by the DRMS form one DMRS RE group, and therefore the 24 REs occupied by the DMRS may be divided into six DMRS RE groups. Each DMRS RE group can carry, in a code division multiplexing (CDM) manner by using a maximum of four groups of orthogonal cover codes (OCC), DMRSs corresponding to four DMRS ports (or may be represented as CDM-4 in time domain). As identified by a pattern 108, each DMRS RE group in which REs are located is used to carry DMRSs of DMRS ports 7, 8, 11, and 13. As identified by a pattern 110, each DMRS RE group in which REs are located is used to carry DMRSs of DMRS ports 9, 10, 12, and 14. Orthogonal cover codes of four REs in each DMRS RE group corresponding to each DMRS port are listed in the following Table 1.

TABLE 1

Example of orthogonal cover codes of four REs in a DMRS RE group corresponding to a DMRS port

| DMRS port | OCC code |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

It can be learned from FIG. 1 that DMRSs of each DMRS port occupy three DMRS RE groups, and the three DMRS RE groups are distributed on three subcarriers. This design manner may be used to withstand channel frequency selectivity. In addition, four REs included in each DMRS RE group are distributed on four OFDM symbols. This design manner may be used to withstand channel time variation.

The foregoing examples briefly describe the current DMRS resource allocation and multiplexing principle. It should be noted that the DMRS resource distribution manner shown in FIG. 1 is only one of current various DMRS resource distribution manners of LTE. According to the current LTE standard, different DMRS resource distribution manners may be used in different scenarios. For example, a DMRS resource distribution manner in an MU-MIMO scenario may be different from a DMRS resource distribution manner in an SU-MIMO scenario. For another example, a DMRS resource distribution manner may vary with a maximum quantity of simultaneously scheduled symbol streams. Therefore, a person skilled in the art needs to understand that the foregoing DMRS resource distribution manner is not intended to limit the scope of the technical solutions provided in the embodiments of the present invention. In a specific implementation process, another DMRS resource distribution manner may alternatively be used.

It can be learned from the example of the DMRS resource distribution manner shown in FIG. 1 that, in the current LTE standard, an RS is usually mapped into a PRB based on a total quantity of antenna ports by using a fixed pilot pattern, and functions of each RS port are the same. As requirements for a plurality of scenarios, a plurality of frequency bands, and a plurality of transmission manners are put forward in 5G NR, and a low-latency and high-reliability indicator is required in a future communications system, the existing RS mapping and configuration solution in which only a fixed mapping manner and a single function are available cannot satisfy complex and diverse communication scenarios in the future.

For example, in a high speed scenario, namely, a typical scenario that needs to be considered in a next-generation communications system, a block pilot pattern shown in the DMRS resource distribution manner shown in FIG. 1 is not applicable to the high speed scenario (estimation error in a case of OCC=4 in time domain), and distributed pilot mapping cannot satisfy the low-latency requirement either. Therefore, a more flexible frame structure design is required. In addition, mapping a DMRS on the last symbol of a subframe cannot ensure enough time for data demodulation (self-contained frame structure).

The current RS mapping and configuration solution in which only a fixed mapping manner and a single function are available cannot satisfy the requirements of the future communications system, and is not applicable to a scenario in which different transmission features of a plurality of waveforms and ports in the system need to be compensated. To eliminate these disadvantages, the following solutions can be considered: irregular mapping of various RS ports in a pilot pattern, configuration of different port multiplexing manners, carrying various different functions by a pilot, configurable density of different ports, and the like.

Based on the above consideration, an embodiment of the present invention provides a reference signal sending solution. An RS in a system can be flexibly configured based on different scenarios and requirements by flexibly mapping an RS port in a pilot pattern, so as to improve spectral efficiency while achieving a higher transmission rate.

Specifically, in reference signal sending solutions provided in some embodiments of the present invention, a base station may determine a dedicated time-frequency resource of at least one second reference signal as a time-frequency resource used to carry a first reference signal, and then send the first reference signal by using the determined time-frequency resource. In this manner, the base station may use an idle RE in an RS pattern to transmit another RS signal simultaneously, thereby improving spectral efficiency while achieving a higher transmission rate.

It should be noted that some words such as "first" and "second" described in this application are used for differentiation only, and do not indicate or imply relative importance or a sequence.

For example, the first reference signal is a CSI-RS, and the second reference signal is a DMRS. In the reference signal sending solutions provided in some embodiments of the present invention, the base station may multiplex the resource in the DMRS pattern design, that is, the DMRS and another RS signal (for example, a CSI-RS) can be mapped onto a same time domain and frequency domain resource.

In some specific embodiments of the present invention, the base station may send an indication signal to indicate a type and a mapping location of another RS that multiplexes the DMRS resource. That is, a plurality of RSs may be multiplexed simultaneously, and a type, density, and a location of the RS may be indicated independently. A sending period of the indication signal is configurable, and the indication signal may be specifically sent in one of the following manners: radio resource control (RRC), downlink control information (DCI), media access control (MAC), or the like. It may be learned that in the foregoing manner, the base station can dynamically configure an RS depending on a scenario. In a multi-terminal system, based on an indication of the base station, an idle RE in a DMRS pattern can be effectively used to transmit a CSI-RS signal simultaneously, so as to improve spectral efficiency while ensuring channel estimation and data demodulation performance, thereby achieving higher resource utilization.

Figure 2:
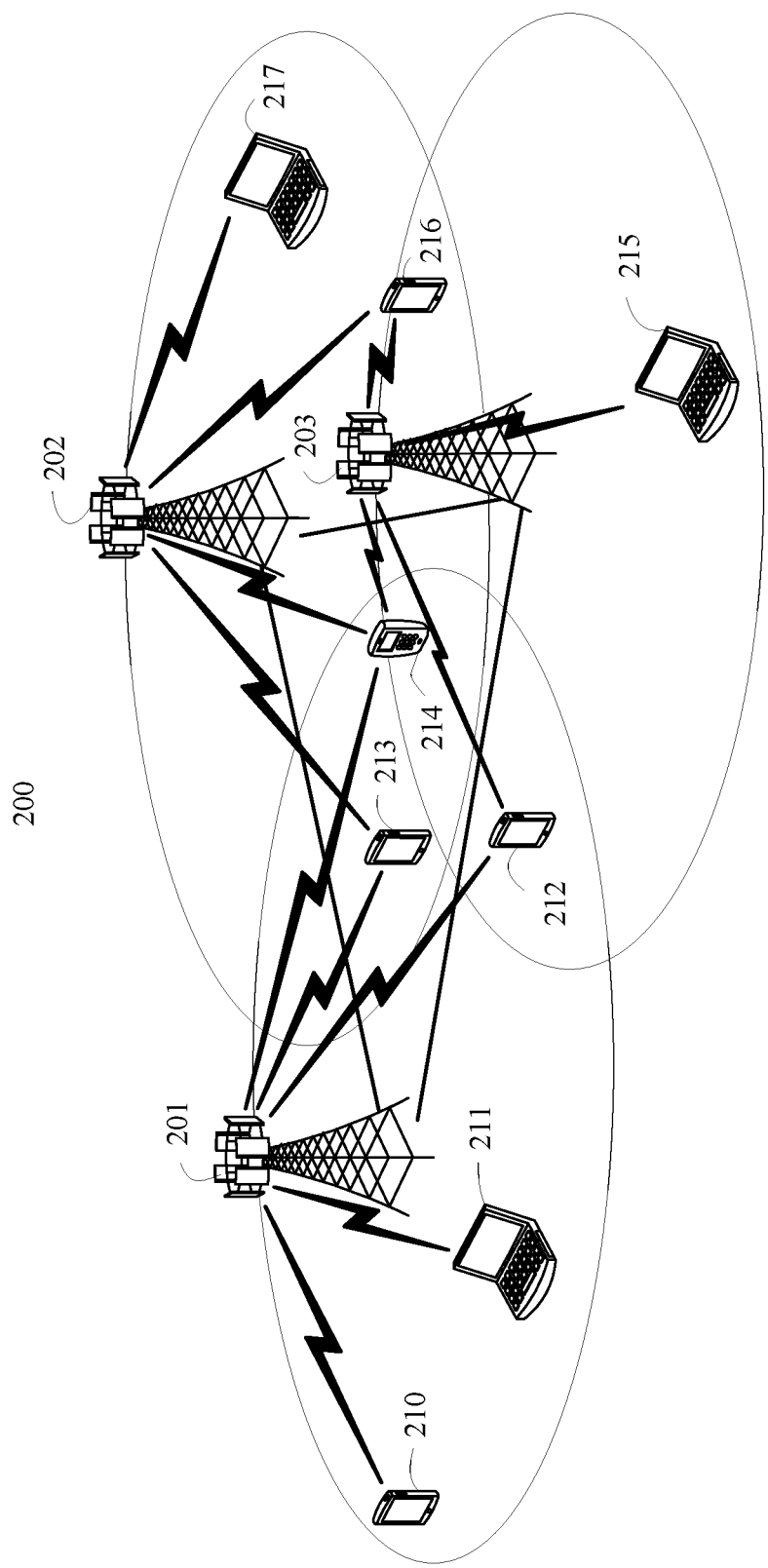
FIG. 2 is a schematic architecture diagram of a wireless communications system according to some embodiments of the present invention.

To more clearly describe the reference signal sending technical solution provided in the embodiments of the present invention, FIG. 2 is a schematic architecture diagram of a wireless communications system according to some embodiments of the present invention.

As shown in FIG. 2, a wireless communications network 200 includes base stations 201 to 203 and terminals 210 to 217. The base stations 201 to 203 may communicate with each other through backhaul (backhaul) links (as shown by straight lines among the base stations 201 to 203). The backhaul link may be a wired backhaul link (for example, an optical fiber or a copper cable) or a wireless backhaul link (for example, a microwave). The terminals 210 to 217 may communicate with the corresponding base stations 201 to 203 through radio links (as shown by fold lines among the base stations 201 to 203 and the terminals 210 to 217).

The base stations 201 to 203 are configured to provide a wireless access service for the terminals 210 to 217. Specifically, each base station corresponds to one service coverage area (referred to as a cell, as shown by each elliptic area in FIG. 2). A terminal that enters the area may communicate with the base station by using a wireless signal, so as to accept the wireless access service provided by the base station. Service coverage areas of the base stations may overlap. A terminal in an overlapping area may receive wireless signals from a plurality of base stations. Therefore, these base stations may coordinate with each other to provide a service for the terminal. For example, the plurality of base stations may provide the service for the terminal in the overlapping area by using a coordinated multipoint (CoMP) technology.

For example, as shown in FIG. 2, a service coverage area of the base station 201 overlaps a service coverage area of the base station 202, and the terminal 213 is located in the overlapping area. Therefore, the terminal 213 may receive wireless signals from the base station 201 and the base station 202. The base station 201 and the base station 202 may coordinate with each other to provide a service for the terminal 213. For another example, as shown in FIG. 2, a common overlapping area exists in the service coverage areas of the base stations 201, 202, and 203, and the terminal 214 is located in the overlapping area. Therefore, the terminal 214 may receive wireless signals from the base stations 201, 202, and 203. The base stations 201, 202, and 203 may coordinate with each other to provide a service for the terminal 214.

Depending on a wireless communications technology in use, a base station may also be referred to as a NodeB, an evolved NodeB (eNodeB), an access point (AP), or the like. In addition, depending on a size of a provided service coverage area, base stations may be classified into a macro base station for providing a macro cell (Macro cell), a micro base station for providing a pico cell, a femto base station for providing a femto cell, and the like. As wireless communications technologies keep evolving, another name may be used for a future base station.

The terminals 210 to 217 may be various wireless communications devices having a wireless communication function, for example but not limited to, a mobile cellular phone, a cordless phone, a personal digital assistant (PDA), a smartphone, a notebook computer, a tablet computer, a wireless data card, a wireless modem (Modulator demodulator), or a wearable device such as a smartwatch. As the Internet of Things (IOT) technology emerges, increasingly more devices that originally do not have a communication function are configured with a wireless communication unit to obtain a wireless communication function, for example, include but are not limited to a household appliance, a transportation vehicle, a tool device, a service device, and a service facility. In this way, these devices can access a wireless communications network and accept remote control. This type of device is configured with a wireless communication unit and therefore has the wireless communication function. Therefore, this type of device is also a kind of wireless communications device. In addition, the terminals 210 to 217 may alternatively be referred to as mobile stations, mobile devices, mobile terminals, wireless terminals, handheld devices, clients, or the like.

The base stations 201 to 203 and the terminals 210 to 217 each may be configured with a plurality of antennas to support a MIMO technology. Further, the base stations 201 to 203 and the terminals 210 to 217 may support an SU-MIMO technology and an MU-MIMO technology, and MU-MIMO may be implemented by using a space division multiple access (SDMA) technology. Configured with a plurality of antennas, the base stations 201 to 203 and the terminals 210 to 217 may further flexibly support a single-input single-output (SISO) technology, a single-input multiple-output (SIMO) technology, and a multiple-input single-output (MISO) technology, so as to implement various diversity (for example but not limited to, transmit diversity and receive diversity) and multiplexing technologies. The diversity technology may include, for example but not limited to, a transmit diversity (TD) technology and a receive diversity (RD) technology. The multiplexing technology may be a spatial multiplexing technology. In addition, the foregoing technologies may further include a plurality of implementation solutions. For example, the transmit diversity technology may include diversity manners such as space time transmit diversity (STTD), space-frequency transmit diversity (SFTD), time switched transmit diversity (TSTD), frequency switched transmit diversity (FSTD), orthogonal transmit diversity (OTD), cyclic delay diversity (CDD), and diversity manners obtained after derivation, evolution, and combination of the foregoing diversity manners. For example, transmit diversity manners such as space time block coding (STBC), space frequency block coding (SFBC), and CDD are used in a current LTE standard.

A general description of transmit diversity is provided above by using examples. A person skilled in the art needs to understand that, in addition to the foregoing examples, transmit diversity is further implemented in a plurality of other manners. Therefore, the foregoing descriptions should not be understood as limitations on the technical solutions of the present invention, and it should be understood that the technical solutions of the present invention are applicable to various possible transmit diversity solutions.

In addition, the base stations 201 to 203 and the terminals 210 to 217 may communicate with each other by using various wireless communications technologies, for example but not limited to, a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (Single Carrier FDMA, SC-FDMA) technology, a space division multiple access (SDMA) technology, and technologies evolving and derived from these technologies. As radio access technologies (RAT), the foregoing wireless communications technologies are adopted in many wireless communications standards, so as to construct various currently well-known wireless communications systems (or networks), including but not limited to a global system for mobile communications (GSM), CDMA 2000, wideband CDMA (WCDMA), Wi-Fi defined in the 802.11 series standards, worldwide interoperability for microwave access (WiMAX), LTE, LTE-A, and systems evolving from these wireless communications systems. Unless otherwise specified, the technical solutions provided in the embodiments of the present invention may be applied to the foregoing various wireless communications technologies and wireless communications systems. In addition, the terms "system" and "network" may be interchanged with each other.

It should be noted that the wireless communications network 200 shown in FIG. 2 is merely an example, and is not intended to limit the technical solutions of the present invention. A person skilled in the art needs to understand that, in a specific implementation process, the wireless communications network 200 may further include another device, and a quantity of base stations and a quantity of terminals may be configured as required.

Figure 3:
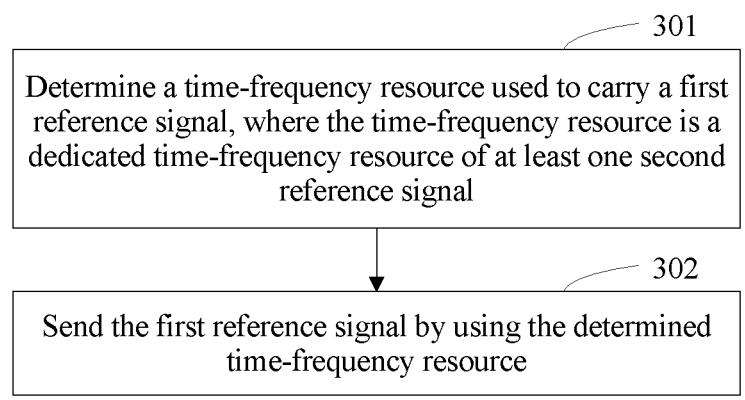
FIG. 3 is a schematic flowchart of a reference signal sending method according to some embodiments of the present invention.

FIG. 3 is a flowchart of a reference signal sending method according to some embodiments of the present invention. A process shown in FIG. 3 may be implemented by a base station. For example, the base station shown in FIG. 2 may be configured with a physical or functional module to perform the process shown in FIG. 3, and the functional module configured to perform the process may be implemented by using hardware, software programming, or a combination of software and hardware.

As shown in FIG. 3, the process includes the following steps:

Step 301: Determine a time-frequency resource used to carry a first reference signal, where the time-frequency resource is a dedicated time-frequency resource of at least one second reference signal.

Step 302: Send the first reference signal by using the determined time-frequency resource.

For convenience of description, the following provides detailed description by using an example in which the base station is configured to perform the process shown in FIG. 3.

From the process shown in FIG. 3, it can be learned that the first reference signal may be carried and sent by using the dedicated time-frequency resource of the at least one second reference signal, so that RS signals such as a DMRS and a CSI-RS can be mapped onto a same time domain and frequency domain resource, and an RS of a system can be flexibly configured based on different scenarios and requirements to effectively use the time-frequency resource. In this way, a problem that only a fixed mapping manner and a single function are available in a current RS mapping and configuration solution is resolved, and spectral efficiency is improved while a higher transmission rate is achieved.

Similar to an RB, an RB pair, a subframe, or another resource structure in an LTE standard, a resource unit (Resource Unit) is provided in some embodiments of the present invention. The resource unit may be used as a basic unit for performing resource allocation for a scheduled user, or may be used to describe arrangement manners of various reference signals.

Figure 4:
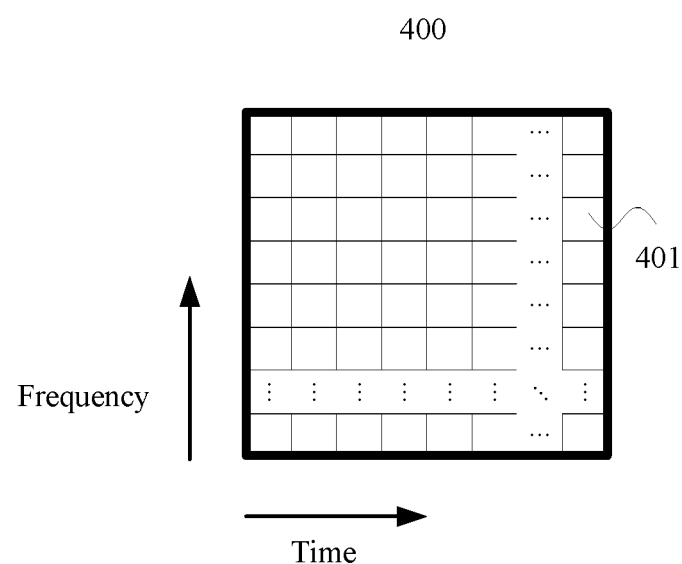
FIG. 4 is a schematic structural diagram of a resource unit according to some embodiments of the present invention.

For example, FIG. 4 is a schematic structural diagram of a resource unit according to some embodiments of the present invention. As shown in FIG. 4, the resource unit 400 occupies a plurality of consecutive subcarriers in frequency domain and a plurality of consecutive symbols (OFDM symbols) in time domain. A minimum resource unit in a resource unit is an RE 401, and each RE occupies one subcarrier in frequency domain and one symbol in time domain. The resource unit 400 usually includes a plurality of REs. Similar to the RB and the RB pair in the LTE standard, the resource unit shown in FIG. 4 may be used as a basic unit for performing resource allocation for a scheduled user, or may be used to describe arrangement manners of various reference signals.

Specifically, in some embodiments of the present invention, as described in step 301, the determining a time-frequency resource used to carry a first reference signal may be specifically determining the time-frequency resource used to carry the first reference signal in a resource unit in which the first reference signal is located.

In some embodiments of the present invention, a type of the first reference signal may be different from a type of the second reference signal.

For example, the first reference signal may be specifically a CSI-RS, and the second reference signal may be specifically a DMRS.

It should be noted that, according to the technical solutions provided in the embodiments of the present invention, two or more reference signals of a same type or different types may be mapped onto a same time domain and frequency domain resource. In consideration of simplified description, one first reference signal and one second reference signal are mainly used as examples for description in this application.

Specifically, in some embodiments of the present invention, the time-frequency resource determined in step 301 is within a scheduling period of the first reference signal, and the second reference signal is not scheduled within the scheduling period.

For example, the first reference signal is a CSI-RS, and the second reference signal is a DMRS. It may be learned that, according to the technical solution provided in the foregoing embodiment of the present invention, an idle RE in a DMRS pattern can be effectively used to transmit a CSI-RS signal simultaneously, thereby improving spectral efficiency while achieving a higher transmission rate.

Specifically, in some embodiments of the present invention, the base station may indicate, by sending a resource configuration indication, a type and a mapping location of a reference signal that multiplexes the time-frequency resource.

For example, in some embodiments of the present invention, the base station may perform the following process A:

Step A1: Generate a resource configuration indication, where the resource configuration indication is used to indicate the time-frequency resource that carries the first reference signal, and the time-frequency resource is the dedicated time-frequency resource of the at least one second reference signal.

Step A2: Send the generated resource configuration indication to a terminal, so that the terminal can obtain the first reference signal by using the time-frequency resource indicated by the resource configuration indication.

It can be learned that in the process A, the terminal can determine, based on the resource configuration indication sent by the base station, the time-frequency resource used to carry the first reference signal, and then obtain the first reference signal by using the determined time-frequency resource.

Specifically, the process including step A1 and step A2 may be performed by the base station before the base station determines, as described in step 301 in the process shown in FIG. 3, the time-frequency resource used to carry the first reference signal. In this way, after receiving the first reference signal sent by the base station, the terminal can obtain the first reference signal from the time-frequency resource determined based on the resource configuration indication.

Specifically, the resource configuration indication may include a reference signal identifier and corresponding resource configuration information. The reference signal identifier may be specifically, for example but not limited to, an antenna port number.

In some embodiments of the present invention, the base station may alternatively indicate, by sending a scheduling indication, a type and a mapping location of a reference signal that multiplexes the time-frequency resource.

For example, in some embodiments of the present invention, the base station may perform the following process B:

Step B1: Generate a scheduling indication used to indicate that the first reference signal is to be scheduled, where the time-frequency resource that carries the first reference signal is the dedicated time-frequency resource of the at least one second reference signal.

Step B2: Send the generated scheduling indication to a terminal, so that the terminal can obtain the first reference signal based on the scheduling indication.

It can be learned that in the process B, the terminal can determine, based on the scheduling indication sent by the base station, that the base station is to invoke the first reference signal, and determine the time-frequency resource used to carry the first reference signal, and then obtain the first reference signal by using the determined time-frequency resource.

Specifically, the process including step B1 and step B2 may alternatively be performed by the base station before the base station determines, as described in step 301 in the process shown in FIG. 3, the time-frequency resource used to carry the first reference signal. In this way, the terminal can obtain the first reference signal based on the scheduling indication after receiving the first reference signal sent by the base station.

Specifically, the scheduling indication may include a reference signal identifier. Similar to the foregoing description, the reference signal identifier may be specifically, for example but not limited to, an antenna port number. The base station may show reference signal invoking by using an antenna port. For example, invoking an antenna port 1 means invoking a reference signal corresponding to the antenna port 1.

In another specific embodiment, the time-frequency resource of the first reference signal may be dynamically indicated. For example, the time-frequency resource of the first reference signal is indicated by using physical layer signaling described below. In this case, a dynamic indication of the time-frequency resource of the first reference signal includes a reference signal identifier and corresponding resource configuration information. The reference signal identifier may be specifically, for example but not limited to, an antenna port number. Compared with the foregoing method in which the time-frequency resource of the first reference signal is configured first by using the resource configuration indication, and then the first reference signal is invoked by using the scheduling indication, dynamically indicating the time-frequency resource of the first reference signal can simultaneously implement configuration and scheduling of the time-frequency resource of the first reference signal.

Specifically, in some embodiments of the present invention, various types of RSs may be multiplexed simultaneously. A type, density, and a location of the RS may be specifically indicated by the base station simultaneously or separately.

Specifically, both the resource configuration indication and the scheduling indication may be sent by using but not limited to one of the following signaling: physical layer signaling, media access control layer signaling, and radio resource control signaling.

The physical layer signaling is also referred to as layer 1 (L1) signaling, and may usually be carried in a control part of a physical layer frame. A typical example of the L1 signaling is downlink control information (DCI) carried on a physical downlink control channel (PDCCH) defined in the LTE standard. In some cases, the L1 signaling may alternatively be carried by a data part of the physical layer frame. It is not difficult to learn that a sending period or a signaling period of the L1 signaling is usually a period of the physical layer frame. Therefore, the signaling is usually used to implement some dynamic control to transfer some frequently changed information. For example, resource allocation information may be transferred by using the physical layer signaling.

The media access control (MAC) layer signaling is layer 2 signaling, and may usually be carried in, for example but not limited to, a frame header of a layer 2 frame. The frame header may further carry, for example but not limited to, information such as a source address and a destination address. In addition to the frame header, the layer 2 frame usually further includes a frame body. In some cases, the L2 signaling may alternatively be carried in the frame body of the layer 2 frame. A typical example of the layer 2 signaling is signaling carried in a frame control field in a frame header of a MAC frame in the 802.11 series standard, or a MAC control entity (Control Entity, MAC) defined in some protocols. The layer 2 frame may usually be carried in the data part of the physical layer frame. The resource indication information may alternatively be sent by using another layer 2 signaling different from the media access control layer signaling.

The radio resource control (RRC) signaling is layer 3 signaling, and is usually some control messages. The L3 signaling may usually be carried in a frame body of a layer 2 frame. A sending period or a control period of the L3 signaling is usually relatively long, and the L3 signaling is applicable to sending of some information that does not change frequently. For example, in some existing communications standards, the L3 signaling is usually used to carry some configuration information. The resource indication information may alternatively be sent by using another layer 3 signaling different from the RRC signaling.

The foregoing describes only principles of the physical layer signaling, the MAC layer signaling, the RRC signaling, the layer 1 signaling, the layer 2 signaling, and the layer 3 signaling. For details about the three types of signaling, refer to the prior art. Therefore, details are not described herein.

It is not difficult to understand that if the resource configuration indication is used to configure the time-frequency resource of the first reference signal, and the scheduling indication is used to schedule the first reference signal, the resource configuration indication is suitable to be sent by using the MAC layer signaling or the RRC signaling, and the scheduling indication is suitable to be sent by using the physical layer signaling. If the solution of dynamically indicating the time-frequency resource of the first reference signal is used, that is, one piece of dynamic configuration signaling is used to configure the time-frequency resource of the first reference signal and schedule the first reference signal, the indication is suitable to be sent by using the physical layer signaling.

Specifically, sending periods of both the resource configuration indication and the scheduling indication are configurable. For example, the sending period may be a preset initial value or may be configured in real time by the base station. For example, when the base station detects that a channel changes, and needs to resend a reference signal to perform channel measurement, the base station may send a resource configuration indication or a scheduling indication to the terminal.

To more clearly describe the reference signal sending technical solution described in the foregoing embodiments of the present invention, the following describes RS mapping in some embodiments of the present invention in different scenarios by using examples and based on the resource unit example shown in FIG. 4.

FIG. 5(a), FIG. 5(b), FIG. 5(c), and FIG. 5(d) are schematic diagrams of RS mapping locations in different scenarios according to some embodiments of the present invention.

It is assumed that a DMRS pattern is designed as follows: Each DMRS port (equivalent to the foregoing second reference signal) occupies six REs, and the DMRS ports include a DMRS port 1 that is invoked, and DMRS ports 2, 3, and 4 that are not invoked. The invoked DMRS port 1 occupies REs distributed on three subcarriers (subcarriers 0, 4, and 8) in frequency domain and on two symbols (symbols 3 and 4) in time domain. The DMRS port 2 that is not invoked is configured to occupy REs distributed on three subcarriers (subcarriers 1, 5, and 9) in frequency domain and on two symbols (symbols 3 and 4) in time domain. The DMRS port 3 that is not invoked is configured to occupy REs distributed on three subcarriers (subcarriers 2, 6, and 10) in frequency domain and on two symbols (symbols 3 and 4) in time domain. The DMRS port 3 that is not invoked is configured to occupy REs on three subcarriers (subcarriers 3, 7, and 11) distributed in frequency domain and on two symbols (symbols 3 and 4) in time domain. Because the DMRS ports 2, 3, and 4 are not invoked, REs corresponding to the DMRS ports 2, 3, and 4 are idle.

Figure 5A:
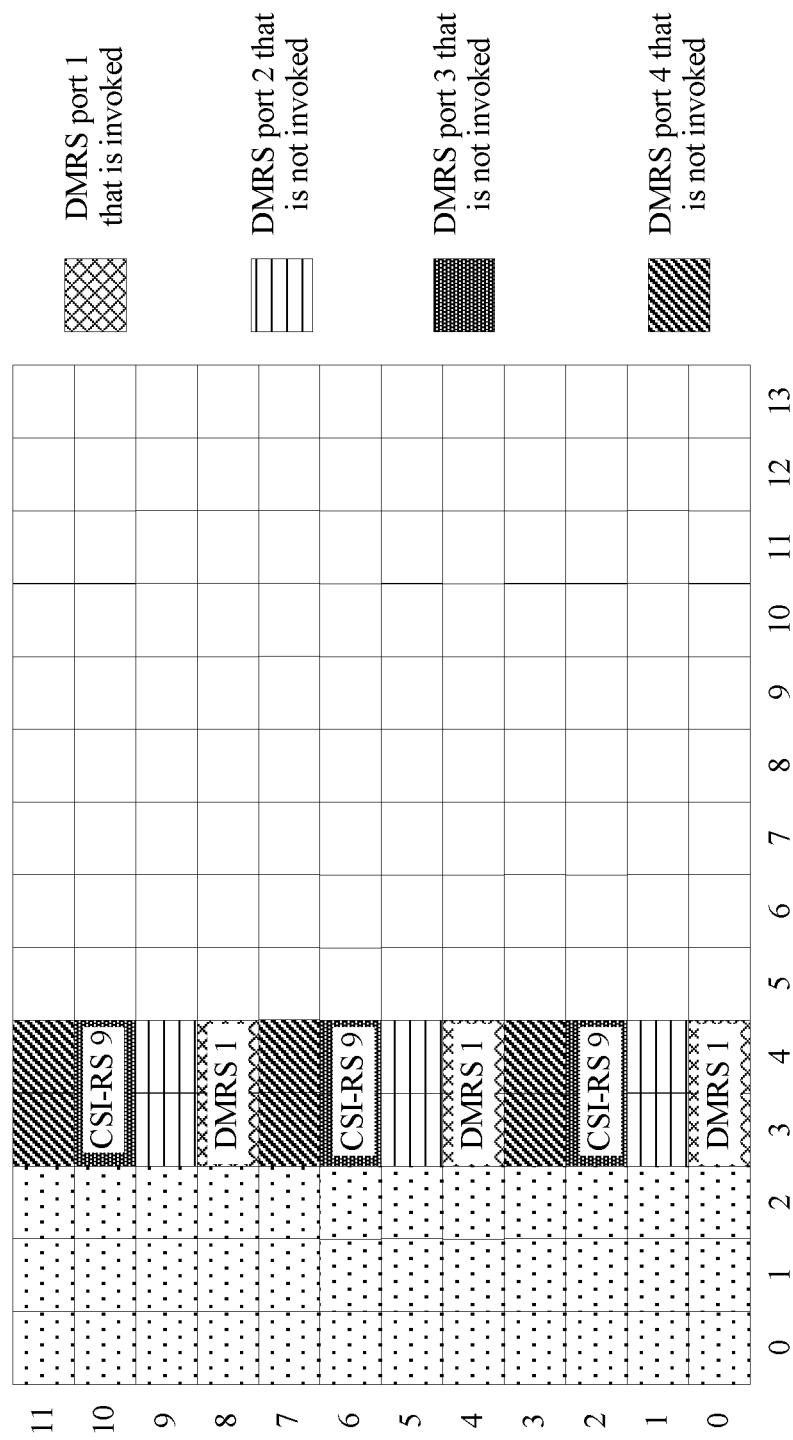
FIG. 5(a) is a schematic diagram of an RS mapping location in a scenario according to some embodiments of the present invention.

FIG. 5(a) is a schematic diagram of an RS mapping location in a scenario according to some embodiments of the present invention. In this example scenario, a CRS-RS 9 (equivalent to the foregoing first reference signal), namely, a CSI-RS port 9, is configured to occupy six idle REs in the assumed DMRS pattern. These REs are distributed on three subcarriers (subcarriers 2, 6, and 10) in frequency domain and on two symbols (symbols 3 and 4) in time domain. It can be learned that the CRS-RS 9 and the DMRS port 3 are mapped onto a same time domain resource, which is equivalent to that a dedicated time-frequency resource corresponding to the DMRS port 3 is configured to carry the CRS-RS 9.

Figure 5B:
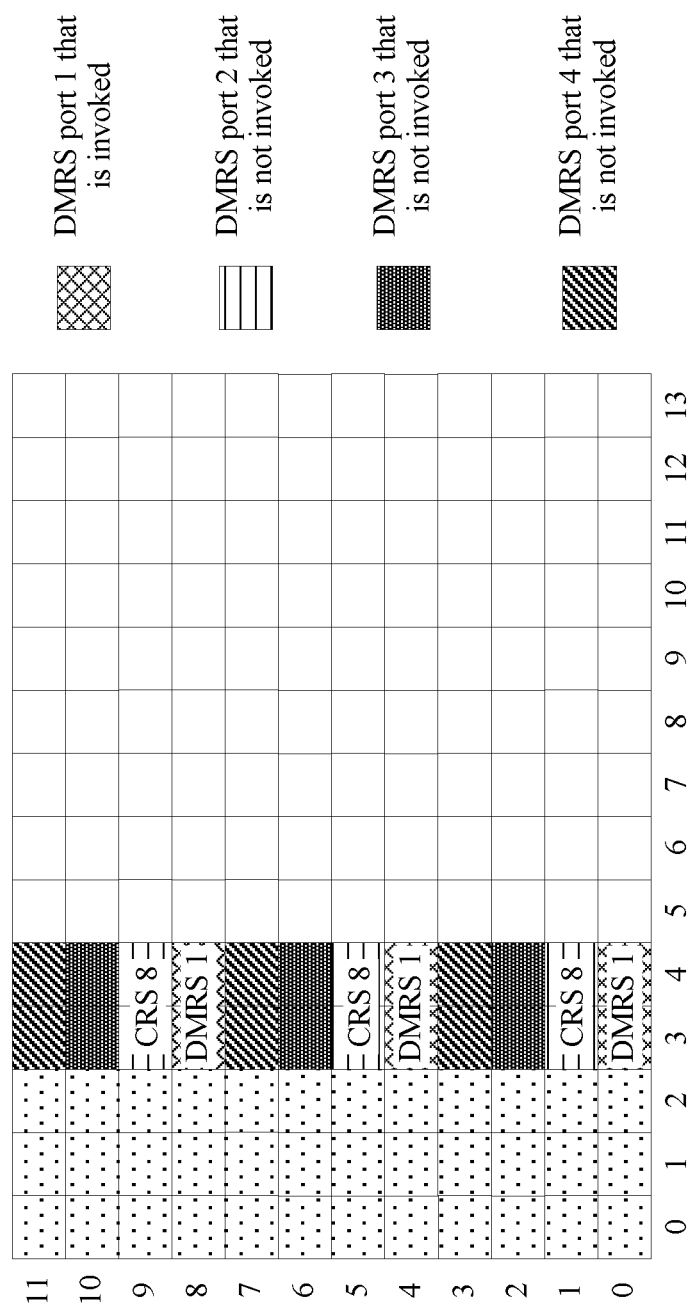
FIG. 5(b) is a schematic diagram of an RS mapping location in another scenario according to some embodiments of the present invention.

FIG. 5(b) is a schematic diagram of an RS mapping location in a scenario according to some embodiments of the present invention. In this example scenario, a CRS 8 (equivalent to the foregoing first reference signal), namely, a CRS port 8, is configured to occupy six idle REs in the assumed DMRS pattern. These REs are distributed on three subcarriers (subcarriers 1, 5, and 9) in frequency domain and on two symbols (symbols 3 and 4) in time domain. It can be learned that the CRS 8 and the DMRS port 2 are mapped onto a same time domain resource, which is equivalent to that a dedicated time-frequency resource corresponding to the DMRS port 2 is configured to carry the CRS 8.

FIG. 5(c) is a schematic diagram of an RS mapping location in another scenario according to some embodiments of the present invention. This example scenario may be considered as a combination of the scenarios shown in FIG. 5(a) and FIG. 5(b). In this scenario, a CRS-RS 9 (equivalent to a first reference signal) is configured to occupy six REs corresponding to the DMRS port 3 (equivalent to a second reference signal), and a CRS 8 (equivalent to another first reference signal) is configured to occupy six REs corresponding to the DMRS port 2. The CRS-RS 9 and the DMRS port 3 are mapped onto a same time domain resource, and the CRS 8 and the DMRS port 2 are mapped onto a same time domain resource.

Figure 5D:
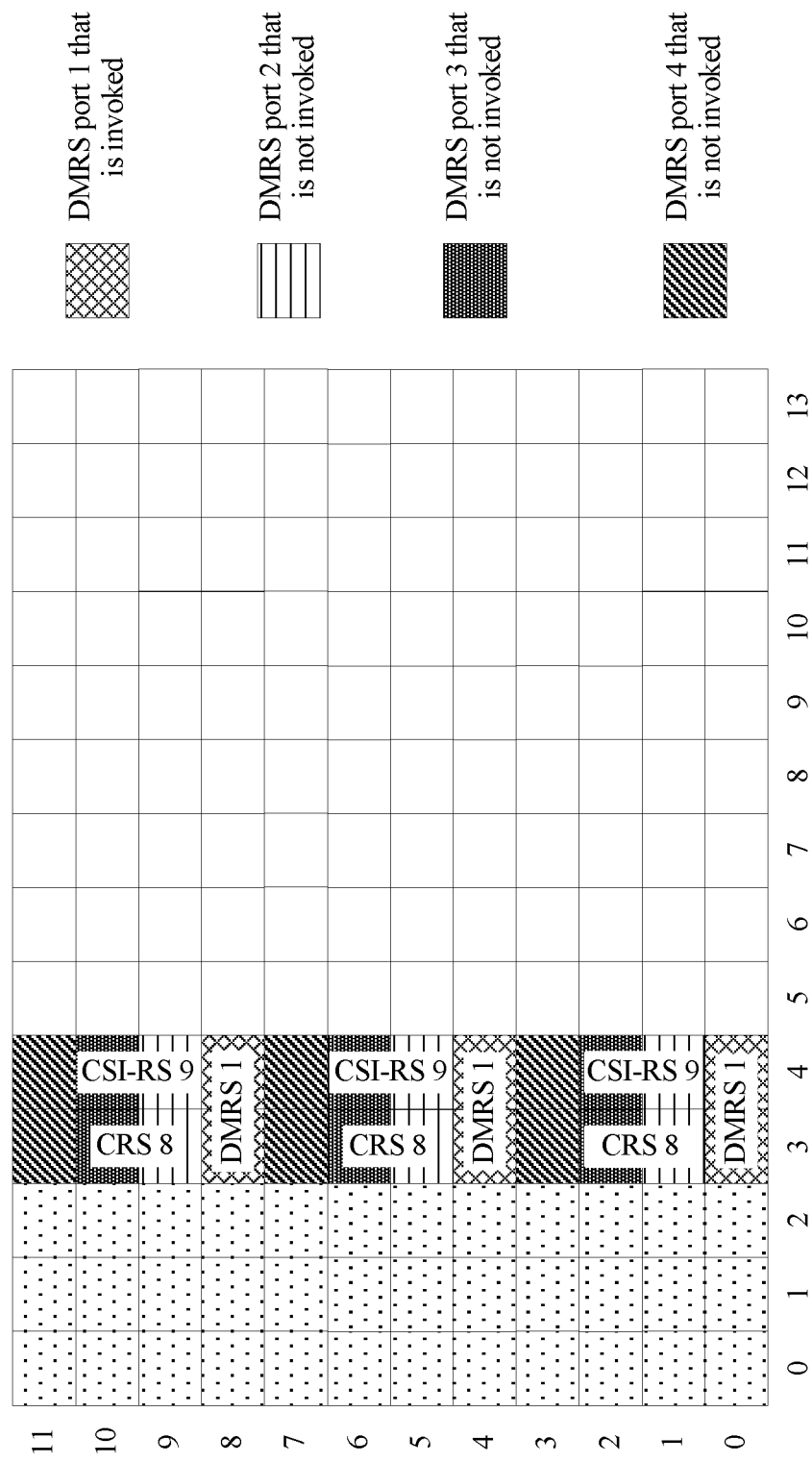
FIG. 5(d) is a schematic diagram of an RS mapping location in yet another scenario according to some embodiments of the present invention.

FIG. 5(d) is a schematic diagram of an RS mapping location in still another scenario according to some embodiments of the present invention. In this example scenario, a CRS 8 (equivalent to a first reference signal) is configured to occupy six idle REs in the assumed DMRS pattern. These REs are distributed on six subcarriers (subcarriers 1, 2, 5, 6, 9, and 10) in frequency domain and on one symbol (symbol 3) in time domain. A CRS-RS 9 (equivalent to another first reference signal) is configured to occupy another six idle REs in the assumed DMRS pattern. These REs are distributed on three subcarriers (subcarriers 1, 2, 5, 6, 9, and 10) in frequency domain and on one symbol (symbol 4) in time domain. It can be learned that the CRS 8 and the CSR-RS 9 are configured to occupy 12 REs corresponding to the DMRS port 2 and the DMRS port 3, which is equivalent to that dedicated time-frequency resources corresponding to the DMRS port 2 and the DMRS port 3 are configured to carry the CRS 8 and the CSR-RS 9.

It should be noted that the CRS 8 may alternatively be another reference signal, for example, a CSI-RS 20, namely, a CSI-RS port 20. Similarly, the CSI-RS 9 may alternatively be another reference signal, for example, a CRS 30, namely, a CRS port 30. In other words, a time-frequency resource of a dedicated DMRS that is not occupied may be allocated to one or more other reference signals, and types of these reference signals may be different from that of the DMRS.

In conclusion, it can be learned that the reference signal sending technical solution provided in the foregoing embodiment of the present invention equivalently provides a pilot design and mapping solution in which a resource can be multiplexed, and introduces a change of related signaling. In the reference signal sending technical solution provided in the foregoing embodiment of the present invention, RS signals may be mapped onto a same time domain and frequency domain resource. The base station may indicate, by sending an indication, the type and the mapping location of the RS that multiplexes a time domain and frequency domain resource. In the technical solution provided in this embodiment of the present invention, a problem that only a fixed mapping manner and a single function are available in the current RS mapping and configuration solution is resolved, and various RSs can be multiplexed simultaneously.

In addition, the type, the density, and the location of the RS may be separately indicated, and the indication may be sent by using RRC, DCI, MAC, or the like. A configuration period of the indication may be a preset initial value, or may be configured in real time.

It can be learned that the reference signal sending technical solution provided in this embodiment of the present invention is configured by using signaling of the base station, so that the terminal can use an idle RE in an RS pattern to transmit another RS signal simultaneously, effectively using the idle RE in the RS pattern to transmit another RS signal simultaneously and improving spectral efficiency while achieving a higher transmission rate. According to the technical solution provided in this embodiment of the present invention, the base station may dynamically configure, based on different communication scenarios, a time-frequency resource used to carry a reference signal, thereby greatly improving spectral efficiency while ensuring channel estimation and data demodulation performance.

In addition, in the technical solution provided in this embodiment of the present invention, interference among terminals in a multi-terminal pairing system can be effectively suppressed, thereby resolving a problem of heavy indication overheads during rate matching (RM) in a scenario with a larger quantity of ports. The solution is applicable to a scenario in which different transmission characteristics of various waveforms and ports need to be compensated in a system.

Figure 6:
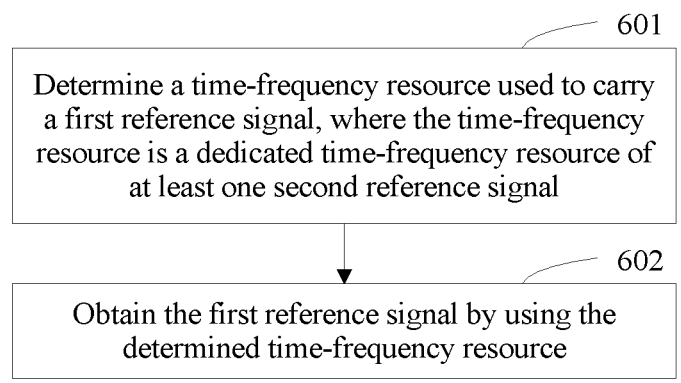
FIG. 6 is a schematic flowchart of a reference signal receiving method according to some embodiments of the present invention.

Based on a same technical concept, FIG. 6 is a flowchart of a reference signal receiving method according to some embodiments of the present invention. A process shown in FIG. 6 may be implemented by a terminal. For example, the terminal shown in FIG. 2 may be configured with a physical or functional module configured to perform the process shown in FIG. 6, and the functional module configured to perform the process may be implemented by using hardware, software programming, or a combination of software and hardware.

As shown in FIG. 6, the process includes the following steps:

Step 601: Determine a time-frequency resource used to carry a first reference signal, where the time-frequency resource is a dedicated time-frequency resource of at least one second reference signal.

Step 602: Obtain the first reference signal by using the determined time-frequency resource.

Corresponding to the foregoing method embodiment on a base station side in this application, in some embodiments of the present invention, the terminal may receive a resource configuration indication used to indicate the time-frequency resource that carries the first reference signal, where the time-frequency resource is the dedicated time-frequency resource of the at least one second reference signal.

Specifically, before determining the time-frequency resource used to carry the first reference signal, the terminal may receive the resource configuration indication sent by a base station, so as to determine, based on the resource configuration indication, the time-frequency resource used to carry the first reference signal.

Alternatively, in some embodiments of the present invention, the terminal may receive a scheduling indication used to indicate that the first reference signal is to be scheduled, where the time-frequency resource that carries the first reference signal is the dedicated time-frequency resource of the at least one second reference signal.

Specifically, before determining the time-frequency resource used to carry the first reference signal, the terminal may receive the scheduling indication sent by a base station, so as to determine, based on the scheduling indication, that the base station is to schedule the first reference signal, and determine the time-frequency resource used to carry the first reference signal.

In some embodiments of the present invention, the time-frequency resource determined in step 601 is within a scheduling period of the first reference signal, and the second reference signal is not scheduled within the scheduling period.

In some embodiments of the present invention, a type of the first reference signal may be different from a type of the second reference signal.

In some embodiments of the present invention, the first reference signal may be a CSI-RS, and the second reference signal may be a DMRS.

Based on the same technical concept, in the foregoing embodiment of the present invention, a specific implementation process in which the terminal determines the time-frequency resource used to carry the first reference signal and obtains the first reference signal by using the determined time-frequency resource may be adjusted adaptively based on the foregoing reference signal sending method process described on the base station side in the present invention.

A specific implementation may be obtained based on the described method embodiment on the base station side in the foregoing embodiment of the present invention, and details are not described herein.

Based on a same inventive concept, this application further provides a reference signal sending apparatus. A functional module of the apparatus may be specifically implemented by using hardware, software, or a combination of software and hardware, and the apparatus may be deployed in a base station. For example, the apparatus may be deployed in the base station in the communications system shown in FIG. 2.

Figure 7:
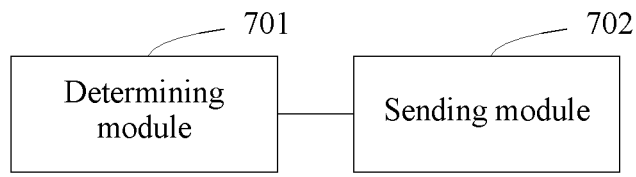
FIG. 7 is a schematic structural diagram of a reference signal sending apparatus according to some embodiments of the present invention.

FIG. 7 is a schematic structural diagram of a reference signal sending apparatus according to some embodiments of the present invention. As shown in FIG. 7, the apparatus includes:

a determining module 701, configured to determine a time-frequency resource used to carry a first reference signal, where the time-frequency resource is a dedicated time-frequency resource of at least one second reference signal; and a sending module 702, configured to send the first reference signal by using the determined time-frequency resource.

In some embodiments of the present invention, a resource configuration indication apparatus is further provided. The apparatus may be configured to generate and send a resource configuration indication used to indicate the time-frequency resource that carries the first reference signal, where the time-frequency resource is the dedicated time-frequency resource of the at least one second reference signal.

In some embodiments of the present invention, a scheduling indication apparatus is further provided. The apparatus may be configured to generate and send a scheduling indication used to indicate that the first reference signal is to be scheduled, where the time-frequency resource that carries the first reference signal is the dedicated time-frequency resource of the at least one second reference signal.

Specifically, both the resource configuration indication apparatus and the scheduling indication apparatus provided in some embodiments of the present invention may be implemented as functional modules in the foregoing reference signal sending apparatus, so that a terminal can determine, based on the received resource configuration indication or scheduling indication, the time-frequency resource that carries the first reference signal.

In some embodiments of the present invention, the determined time-frequency resource is within a scheduling period of the first reference signal, and the second reference signal is not scheduled within the scheduling period.

In some embodiments of the present invention, a type of the first reference signal may be different from a type of the second reference signal.

In some embodiments of the present invention, the first reference signal may be a CSI-RS, and the second reference signal may be a DMRS.

Specifically, the apparatus provided in the foregoing embodiment of the present invention and the method embodiment on the base station side provided in the foregoing embodiment of the present invention have similar principles for problem resolving. Therefore, mutual reference may be made between a specific implementation of the apparatus provided in the foregoing embodiment of the present invention and the implementation of the method on the base station side provided in the foregoing embodiment of the present invention. Repeated content is not described herein again.

Based on the same inventive concept, this application further provides a reference signal receiving apparatus. A functional module of the apparatus may be specifically implemented by using hardware, software, or a combination of software and hardware, and the apparatus may be deployed in a terminal. For example, the apparatus may be deployed in the terminal in the communications system shown in FIG. 2.

Figure 8:
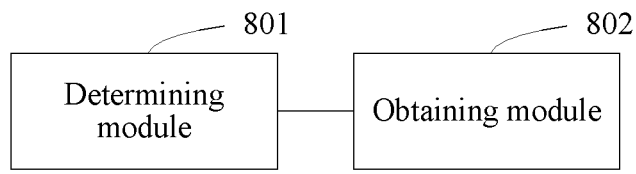
FIG. 8 is a schematic structural diagram of a reference signal receiving apparatus according to some embodiments of the present invention.

FIG. 8 is a schematic structural diagram of a reference signal receiving apparatus according to some embodiments of the present invention. As shown in FIG. 8, the apparatus includes:

a determining module 801, configured to determine a time-frequency resource used to carry a first reference signal, where the time-frequency resource is a dedicated time-frequency resource of at least one second reference signal; and an obtaining module 802, configured to obtain the first reference signal by using the determined time-frequency resource.

Corresponding to the foregoing apparatus embodiment on a base station side in this application, a resource configuration indication receiving apparatus is further provided in some embodiments of the present invention. The apparatus may be configured to receive a resource configuration indication used to indicate the time-frequency resource that carries the first reference signal, where the time-frequency resource is the dedicated time-frequency resource of the at least one second reference signal.

In some embodiments of the present invention, a scheduling indication receiving apparatus is further provided. The apparatus may be configured to receive a scheduling indication used to indicate that the first reference signal is to be scheduled, where the time-frequency resource that carries the first reference signal is the dedicated time-frequency resource of the at least one second reference signal.

Specifically, both the resource configuration indication receiving apparatus and the scheduling indication receiving apparatus provided in some embodiments of the present invention may be implemented as functional modules in the foregoing reference signal sending apparatus, so that a terminal can determine, based on the received resource configuration indication or scheduling indication, the time-frequency resource that carries the first reference signal.

In some embodiments of the present invention, the determined time-frequency resource is within a scheduling period of the first reference signal, and the second reference signal is not scheduled within the scheduling period.

In some embodiments of the present invention, a type of the first reference signal may be different from a type of the second reference signal.

In some embodiments of the present invention, the first reference signal may be a CSI-RS, and the second reference signal may be a DMRS.

Specifically, the apparatus provided in the foregoing embodiment of the present invention and the method embodiment on a terminal side provided in the foregoing embodiment of the present invention have similar principles for problem resolving. Therefore, mutual reference may be made between a specific implementation of the apparatus provided in the foregoing embodiment of the present invention and the implementation of the method on the terminal side provided in the foregoing embodiment of the present invention. Repeated content is not described herein again.

Module division in the embodiments of this application is an example, and is merely a kind of logical function division. In actual implementation, there may be another division manner. In addition, functional modules in the embodiments of this application may be integrated into one processor, or may exist alone physically, or two or more modules may be integrated into one module. The integrated module may be implemented in a form of hardware, or may be implemented in a form of a software functional module.

Figure 9:
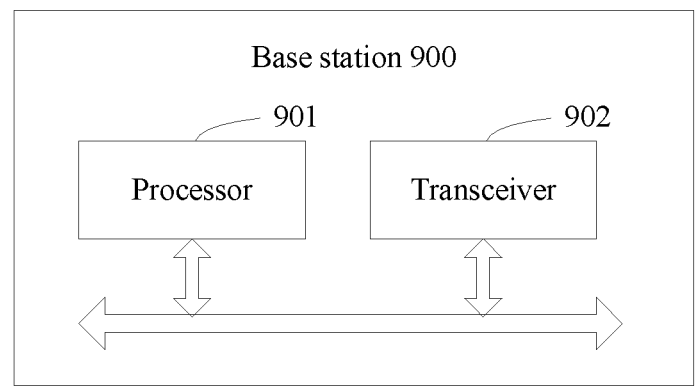
FIG. 9 is a schematic structural diagram of a base station according to some embodiments of the present invention.

Based on the same inventive concept, this application further provides a base station. FIG. 9 is a schematic structural diagram of a base station according to some embodiments of the present invention.

As shown in FIG. 9, the base station 900 may include a processor 901. The processor 901 may be a central processing module (central processing unit, CPU), a digital processing module, or the like. The base station 900 may further include a transceiver 902. The processor 901 is configured to determine a time-frequency resource used to carry a first reference signal, where the time-frequency resource is a dedicated time-frequency resource of at least one second reference signal; and the transceiver 902 is configured to send the first reference signal by using the time-frequency resource determined by the processor 901. The processor 901 and the transceiver 902 are specifically configured to perform the method on the base station side provided in the foregoing embodiment of the present invention. Details are not described herein.

Although not shown in the figure, the base station 900 may further include a memory configured to store a program executed by the processor 901. The memory may be a nonvolatile memory, such as a hard disk drive (HDD) or a solid-state drive (SSD), or may be a volatile memory, such as a random access memory (RAM). The memory is, but not limited to, any other medium that can be configured to carry or store desired program code in a form of an instruction or a data structure and can be accessed by a computer.

In this embodiment of this application, a specific connection medium between the processor 901 and the transceiver 902 is not limited. In this embodiment of this application, the processor 901 and the transceiver 902 are connected via a bus in FIG. 9. In FIG. 9, a hollow double-arrow line is used to indicate the bus, but this does not indicate that there is only one bus or only one type of bus. Connection manners among other components are merely examples and are not restrictive. The bus may be classified into an address bus, a data bus, a control bus, and the like.

An embodiment of the present invention further provides a readable storage medium. The readable storage medium is configured to store a software instruction that needs to be executed by the processor, and the software instruction includes a program that needs to be executed by the processor.

Figure 10:
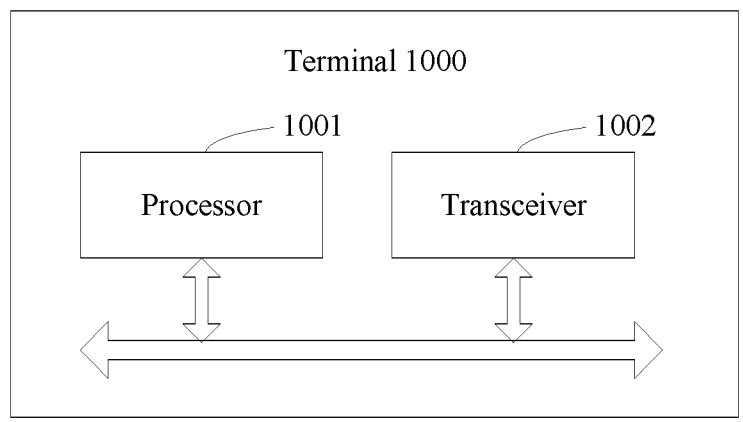
FIG. 10 is a schematic structural diagram of a terminal according to some embodiments of the present invention.

Based on the same inventive concept, this application further provides a terminal. FIG. 10 is a schematic structural diagram of a terminal according to some embodiments of the present invention.

As shown in FIG. 10, the terminal 1000 may include a processor 1001. The processor 1001 may be a central processing module (CPU), a digital processing module, or the like. The terminal 1000 may further include a transceiver 1002. The processor 1001 is configured to determine a time-frequency resource used to carry a first reference signal, where the time-frequency resource is a dedicated time-frequency resource of a second reference signal; and obtain the first reference signal by using the transceiver 1002 using the determined time-frequency resource. The processor 1001 and the transceiver 1002 are specifically configured to perform the method on the terminal side provided in the foregoing embodiment of the present invention. Details are not described herein.

Although not shown in the figure, the terminal 1000 may further include a memory configured to store a program executed by the processor 1001. The memory may be a nonvolatile memory, such as a hard disk drive (HDD) or a solid-state drive (SSD), or may be a volatile memory, such as a random access memory (RAM). The memory is, but not limited to, any other medium that can be configured to carry or store desired program code in a form of an instruction or a data structure and can be accessed by a computer.

In this embodiment of this application, a specific connection medium between the processor 1001 and the transceiver 1002 is not limited. In this embodiment of this application, the processor 1001 and the transceiver 1002 are connected via a bus in FIG. 10. In FIG. 10, a hollow double-arrow line is used to indicate the bus, but this does not indicate that there is only one bus or only one type of bus. Connection manners among other components are merely examples and are not restrictive. The bus may be classified into an address bus, a data bus, a control bus, and the like.

An embodiment of the present invention further provides a readable storage medium. The readable storage medium is configured to store a software instruction that needs to be executed by the processor, and the software instruction includes a program that needs to be executed by the processor.

A person skilled in the art needs to understand that the embodiments of this application may be provided as a method, a system, or a program product. Therefore, this application may use a form of hardware only embodiments, software only embodiments, or embodiments with a combination of software and hardware. Moreover, this application may use a form of a computer program product that is implemented on one or more usable storage media (including but not limited to a disk memory, a CD-ROM, an optical memory, and the like) that include computer usable program code.

This application is described with reference to the flowcharts and/or block diagrams of the method, the device (system), and the program product according to this application. It should be understood that program instructions may be used to implement each process and/or each block in the flowcharts and/or the block diagrams and a combination of a process and/or a block in the flowcharts and/or the block diagrams. These program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These program instructions may be stored in a readable memory that can instruct a computer or another programmable data processing device to work in a specific manner, so that the instructions stored in the readable memory generate an artifact that includes an instruction apparatus. The instruction apparatus implements a specific function in one or more processes in the flowcharts and/or in one or more blocks in the block diagrams.

These program instructions may be loaded onto a computer or another programmable data processing device, so that a series of operation steps are performed on the computer or the another programmable device, thereby generating computer-implemented processing. Therefore, the instructions executed on the computer or the programmable device provide steps for implementing a specific function in one or more processes in the flowcharts and/or in one or more blocks in the block diagrams.

Apparently, a person skilled in the art may make various modifications and variations to this application without departing from the scope of this application. This application is intended to cover these modifications and variations of this application provided that they fall within the scope of protection defined by the following claims and their equivalent technologies.

What is claimed is:

1. A reference signal receiving method, comprising:
   determining a time-frequency resource used to carry a first reference signal, wherein the determined time-frequency resource is a dedicated time-frequency resource that is dedicated for carrying at least one second reference signal but is currently unused for the at least one second reference signal; and
   obtaining the first reference signal by using the determined time-frequency resource, thereby using a formerly unused time-frequency resource for the at least one second reference signal for the first reference signal,
   wherein before the determining the time-frequency resource used to carry the first reference signal, further comprising:
   receiving a resource configuration indication, wherein the resource configuration indication indicates the time-frequency resource that carries the first reference signal, and the time-frequency resource is the dedicated time-frequency resource of the at least one second reference signal.

2. The method according to claim 1, wherein before the determining the time-frequency resource used to carry the first reference signal, further comprising:
   receiving a scheduling indication, wherein the scheduling indication indicates that the first reference signal is to be scheduled, and the time-frequency resource that carries the first reference signal is the dedicated time-frequency resource of the at least one second reference signal.

3. The method according to claim 1, wherein the determined time-frequency resource is within a scheduling period of the first reference signal, and the second reference signal is not scheduled within the scheduling period.

4. The method according to claim 1, wherein a type of the first reference signal is different from a type of the second reference signal.

5. The method according to claim 1, wherein the first reference signal is a channel state information-reference signal (CSI-RS), and the second reference signal is a demodulation reference signal (DMRS).

6. A reference signal receiving apparatus, wherein the apparatus is deployed in a terminal, and the apparatus comprises:
   a processor; and
   a memory storing instructions that when executed configure the processor to perform a reference signal receiving method comprising:
   receiving a resource configuration indication, wherein the resource configuration indication indicates a time-frequency resource that carries a first reference signal, and the time-frequency resource is a dedicated time-frequency resource of at least one second reference signal;
   determining the time-frequency resource used to carry the first reference signal, wherein the determined time-frequency resource is the dedicated time-frequency resource that is dedicated for carrying the at least one second reference signal but is currently unused for the at least one second reference signal; and
   obtaining the first reference signal by using the determined time-frequency resource, thereby using a formerly unused time-frequency resource for the at least one second reference signal for the first reference signal.

7. The apparatus according to claim 6, wherein the reference signal receiving method further comprises receiving a scheduling indication, wherein the scheduling indication indicates that the first reference signal is to be scheduled, and the time-frequency resource that carries the first reference signal is the dedicated time-frequency resource of the at least one second reference signal.

8. The apparatus according to any one of claim 6, wherein the determined time-frequency resource is within a scheduling period of the first reference signal, and the second reference signal is not scheduled within the scheduling period.

9. The apparatus according to any one of claim 6, wherein a type of the first reference signal is different from a type of the second reference signal.

10. The apparatus according to any one of claim 6, wherein the first reference signal is a channel state information-reference signal (CSI-RS), and the second reference signal is a demodulation reference signal (DMRS).

11. A terminal, wherein the terminal comprises a processor and a transceiver, wherein the processor is configured to:
    receive a resource configuration indication by using the transceiver, wherein the resource configuration indication indicates a time-frequency resource that carries a first reference signal, and the time-frequency resource is a dedicated time-frequency resource of at least one second reference signal;
    determine the time-frequency resource used to carry the first reference signal, wherein the determined time-frequency resource is t e dedicated time-frequency resource that is dedicated for carrying the at least one second reference signal but is currently unused for the at least one second reference signal; and
    obtain the first reference signal by using the determined time-frequency resource, thereby using a formerly unused time-frequency resource for the at least one second reference signal for the first reference signal.

12. The terminal according to claim 11, wherein the processor is further configured to:
    receive a scheduling indication by using the transceiver, wherein the scheduling indication indicates that the first reference signal is to be scheduled, and the time-frequency resource that carries the first reference signal is the dedicated time-frequency resource of the at least one second reference signal.

13. The terminal according to any one of claim 11, wherein the determined time-frequency resource is within a scheduling period of the first reference signal, and the second reference signal is not scheduled within the scheduling period.

14. The terminal according to any one of claim 11, wherein a type of the first reference signal is different from a type of the second reference signal.

15. The terminal according to any one of claim 11, wherein the first reference signal is a channel state information-reference signal (CSI-RS), and the second reference signal is a demodulation reference signal (DMRS).

* * * * *

UNITED STATES PATENT AND TRADEMARK OFFICE
CERTIFICATE OF CORRECTION

PATENT NO. : 11,101,957 B2
APPLICATION NO. : 16/523737
DATED : August 24, 2021
INVENTOR(S) : Liu et al.

It is certified that error appears in the above-identified patent and that said Letters Patent is hereby corrected as shown below:

In the Claims

Claim 11: Column 24, Line 42: "frequency resource is t e dedicated time-frequency" should read
-- frequency resource is the dedicated time-frequency --.

Signed and Sealed this
Twelfth Day of July, 2022

Katherine Kelly Vidal
*Director of the United States Patent and Trademark Office*